United States Patent
Hashimoto

(10) Patent No.: US 11,509,762 B2
(45) Date of Patent: Nov. 22, 2022

(54) CABLE LENGTH CALCULATION SYSTEM AND CABLE LENGTH CALCULATION METHOD

(71) Applicant: MITSUBISHI ELECTRIC CORPORATION, Tokyo (JP)

(72) Inventor: Shigeru Hashimoto, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/243,124

(22) Filed: Apr. 28, 2021

(65) Prior Publication Data

US 2021/0250440 A1 Aug. 12, 2021

Related U.S. Application Data

(63) Continuation of application No. PCT/JP2018/046930, filed on Dec. 20, 2018.

(51) Int. Cl.
H04M 3/32 (2006.01)
H04B 3/46 (2015.01)

(52) U.S. Cl.
CPC .............. *H04M 3/32* (2013.01); *H04B 3/46* (2013.01)

(58) Field of Classification Search
None
See application file for complete search history.

(56) References Cited

U.S. PATENT DOCUMENTS 7,772,543 B2 * 8/2010 Grier .................. B82Y 30/00
250/251
7,773,543 B2 8/2010 Gross
(Continued)

FOREIGN PATENT DOCUMENTS

JP 1-175428 A 7/1989
JP 3-99550 A 4/1991
(Continued)

OTHER PUBLICATIONS

International Search Report (PCT/ISA/210) issued in PCT/JP2018/046930 dated Mar. 12, 2019.
(Continued)

*Primary Examiner* — Quoc D Tran
(74) *Attorney, Agent, or Firm* — Birch, Stewart, Kolasch & Birch, LLP

(57) ABSTRACT

A cable length calculation system (10) includes a controller (20) and a plurality of communication apparatuses (30) which are connected via a cable (40). A measurement master which is one communication apparatus (30) among the plurality of communication apparatuses (30) counts as a first number, the number of clock signals output by an oscillator from a time of transmitting a measurement packet until a time of receiving a response packet. A measurement slave which is a communication apparatus (30) different from the measurement master among the plurality of communication apparatuses (30) counts as a second number, the number of clock signals output by an oscillator from a time of receiving the measurement packet transmitted by the measurement master until a time of transmitting the response packet. The controller (20) calculates a length of the cable (40) between the measurement master and the measurement slave based on the first number and the second number.

5 Claims, 8 Drawing Sheets

(56) References Cited

U.S. PATENT DOCUMENTS

| | | | |
|---|---|---|---|
| 8,265,232 B2* | 9/2012 | Lindqvist | H04B 3/48 379/1.04 |
| 2007/0014393 A1* | 1/2007 | Jensen | H04B 3/46 379/30 |
| 2008/0107242 A1 | 5/2008 | Ichihara et al. | |
| 2008/0144534 A1 | 6/2008 | Gross | |
| 2011/0205917 A1 | 8/2011 | Konishi | |
| 2013/0254443 A1* | 9/2013 | Sixt | H04L 12/40136 710/110 |

FOREIGN PATENT DOCUMENTS

| | | |
|---|---|---|
| JP | 6-104982 A | 4/1994 |
| JP | 7-95222 A | 4/1995 |
| JP | 11-161601 A | 6/1999 |
| JP | 2003-32758 A | 1/2003 |
| JP | 2003-244030 A | 8/2003 |
| JP | 2005-18291 A | 1/2005 |
| JP | 2005-186734 A | 7/2005 |
| JP | 2011-172117 A | 9/2011 |
| JP | 2018-181439 A | 11/2018 |

OTHER PUBLICATIONS

Extended European Search Report for European Application No. 18943588.6, dated Oct. 21, 2021.
Chinese Office Action dated Aug. 8, 2022 issued in corresponding Chinese Application No. 201880099597.6 with an English Translation.

\* cited by examiner

CABLE LENGTH CALCULATION SYSTEM AND CABLE LENGTH CALCULATION METHOD

CROSS REFERENCE TO RELATED APPLICATIONS

This application is a Continuation of PCT International Application No. PCT/JP2018/046930, filed on Dec. 20, 2018, which is hereby expressly incorporated by reference into the present application.

TECHNICAL FIELD

The present invention relates to a technique for measuring a length of a cable connecting between communication apparatuses.

BACKGROUND ART

A controller, a large number of air conditioners, a large number of lights, and a large number of sensors are connected to each other by a wired network for a purpose of controlling and condition-monitoring. In recent years, an idea of enhancing an energy saving ability by integrated control of pieces of apparatuses such as air conditioners has permeated. Therefore, a network is demanded which is high-speed, has good construction ability and maintainability, and can take a flexible configuration according to a structure of a building.

In particular, it is demanded to enable to accurately measure a length of a cable between apparatuses online for a purpose of specifying a disconnected position of the cable in a test conducted after construction and an inspection at a time of an abnormality occurrence.

Further, in Factory Automation (FA) facilities and power receiving and distributing facilities in a factory, instrumentation facilities in a plant, a public infrastructure, and the like, apparatuses such as a controller, an actuator, and a sensor are connected to each other by a wired network. Since a cable break in these facilities has a large impact, it is demanded to enable to accurately measure the length of the cable between the apparatuses online.

Patent Literature 1 describes a technique for measuring the length of the cable by transmitting a signal to a partner device and counting the number of clocks until a signal that is returned from the partner device is received.

CITATION LIST

Patent Literature

Patent Literature 1: JP2011-172117A

SUMMARY OF INVENTION

Technical Problem

When obtaining the length of the cable by the technique described in Patent Literature 1, a time from a time when the partner device receives the signal until a time of turning back is not taken into consideration. It is considered to reduce as much time of transmitting back as possible by directly transmitting back a received signal. However, in a half-duplex system, since the signal cannot be transmitted during a reception of the signal, transmitting back is not possible. Further, even in a full-duplex system, if the received signal is transmitted without signal processing, an original communication performance cannot be exerted due to a signal deterioration.

The present invention aims to enable to accurately measure a length of a cable between apparatuses online by a simple configuration.

Solution to Problem

A cable length calculation system according to the present invention including a controller and a plurality of communication apparatuses which are connected via a cable, wherein a measurement master which is one communication apparatus among the plurality of communication apparatuses counts as a first number, the number of clock signals output by an oscillator from a time of transmitting a measurement packet to the cable until a time of receiving a response packet from the cable, and wherein a measurement slave which is a communication apparatus different from the measurement master among the plurality of communication apparatuses counts as a second number, the number of clock signals output by an oscillator from a time of receiving from the cable, the measurement packet transmitted by the measurement master until a time of transmitting the response packet to the cable, and wherein the controller calculates a length of the cable between the measurement master and the measurement slave based on the first number counted by the measurement master and the second number counted by the measurement slave.

Advantageous Effects of Invention

In the present invention, a measurement master counts as a first number, the number of clock signals output by an oscillator from a time of transmitting a measurement packet until a time of receiving a response packet, and a measurement slave counts as a second number, the number of clock signals output by the oscillator from a time of receiving the measurement packet until a time of transmitting the response packet. Then, a length of a cable between the measurement master and the measurement slave is calculated based on the first number and the second number. Hence, it is possible to enable to accurately measure a length of a cable between apparatuses online.

DESCRIPTION OF EMBODIMENTS

First Embodiment

Description of Configuration

Figure 1:
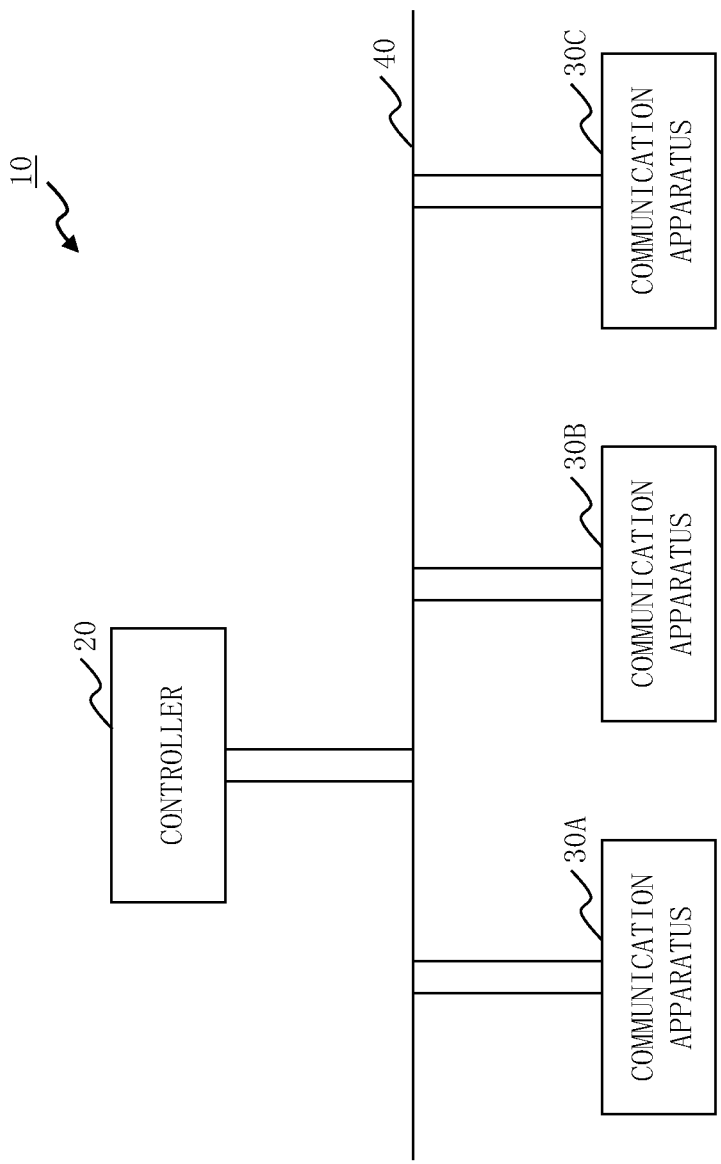
FIG. 1 is a configuration diagram of a cable length calculation system 10 according to a first embodiment.

A configuration of a cable length calculation system 10 according to a first embodiment will be described with reference to FIG. 1.

The cable length calculation system 10 includes a controller 20 and a plurality of communication apparatuses 30 which are connected via a cable 40. In FIG. 1, the cable length calculation system 10 includes a communication apparatus 30A, a communication apparatus 30B, and a communication apparatus 30C as the plurality of communication apparatuses 30.

Figure 2:
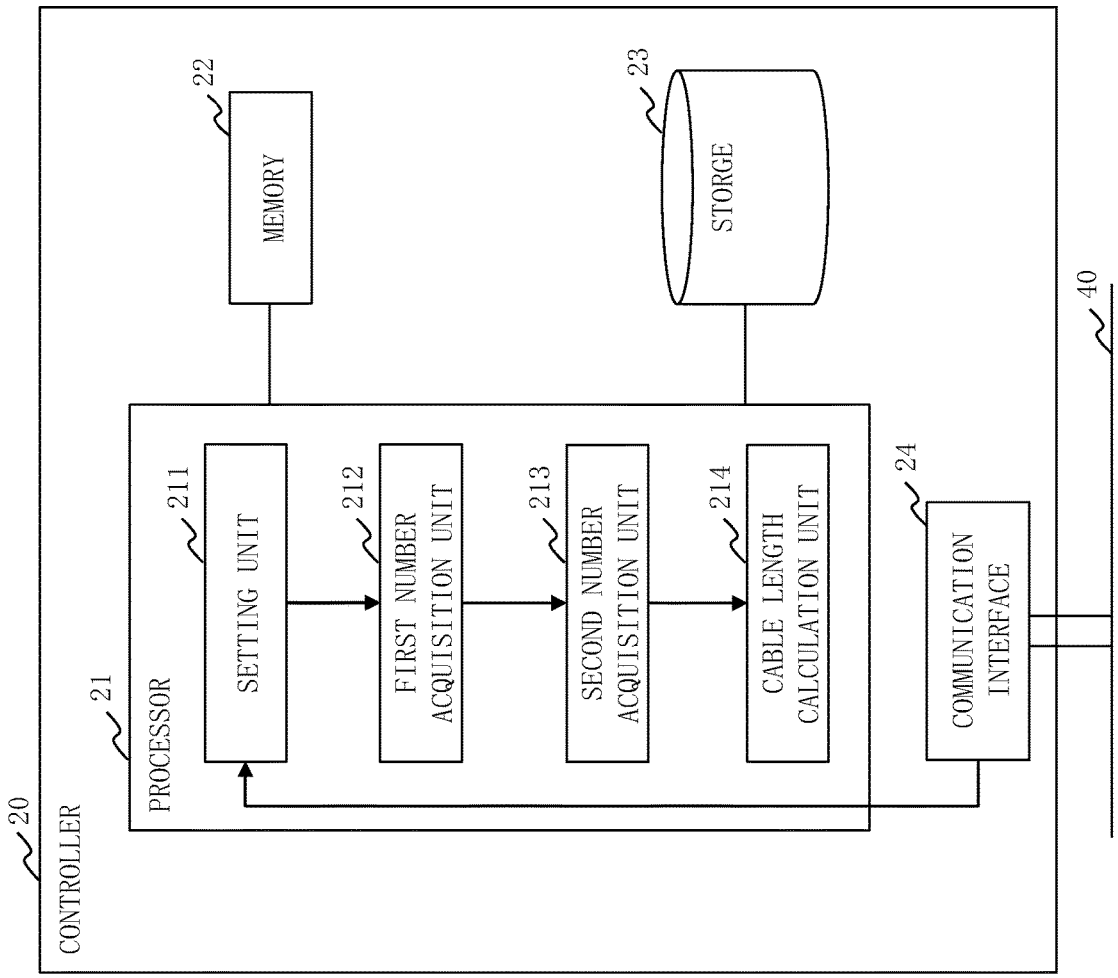
FIG. 2 is a configuration diagram of a controller 20 according to the first embodiment.

A configuration of the controller 20 according to the first embodiment will be described with reference to FIG. 2.

The controller 20 is a computer.

The controller 20 includes pieces of hardware which are a processor 21, a memory 22, a storage 23, and a communication interface 24. The processor 21 is connected to other pieces of hardware via a signal line and controls these other pieces of hardware.

The processor 21 is an Integrated Circuit (IC) that performs processing. Specific examples of the processor 21 are a Central Processing Unit (CPU), a Digital Signal Processor (DSP), and a Graphics Processing Unit (GPU).

The memory 22 is a storage device that temporarily stores data. Specific examples of the memory 22 are a Static Random Access Memory (SRAM) and a Dynamic Random Access Memory (DRAM).

The storage 23 is a storage device that stores data. A specific example of the storage 23 is a Hard Disk Drive (HDD). Further, the storage 23 may be a portable recording medium such as a Secure Digital (registered trademark, SD) memory card, a CompactFlash (CF, registered trademark), an NAND flash, a flexible disk, an optical disk, a compact disk, a Blu-ray (registered trademark) disk, or a Digital Versatile Disk (DVD).

The communication interface 24 is an interface for communicating with an external device. Specific examples of the communication interface 24 are ports of an Ethernet (registered trademark), a Universal Serial Bus (USB), and a High-Definition Multimedia Interface (registered trademark, HDMI).

The controller 20 includes a setting unit 211, a first number acquisition unit 212, a second number acquisition unit 213, and a cable length calculation unit 214 as functional components. A function of each functional component of the controller 20 is realized by software.

The storage 23 stores a program that realizes the function of each functional component of the controller 20. This program is read into the memory 22 by the processor 21 and executed by the processor 21. Hence, the function of each functional component of the controller 20 is realized.

Figure 3:
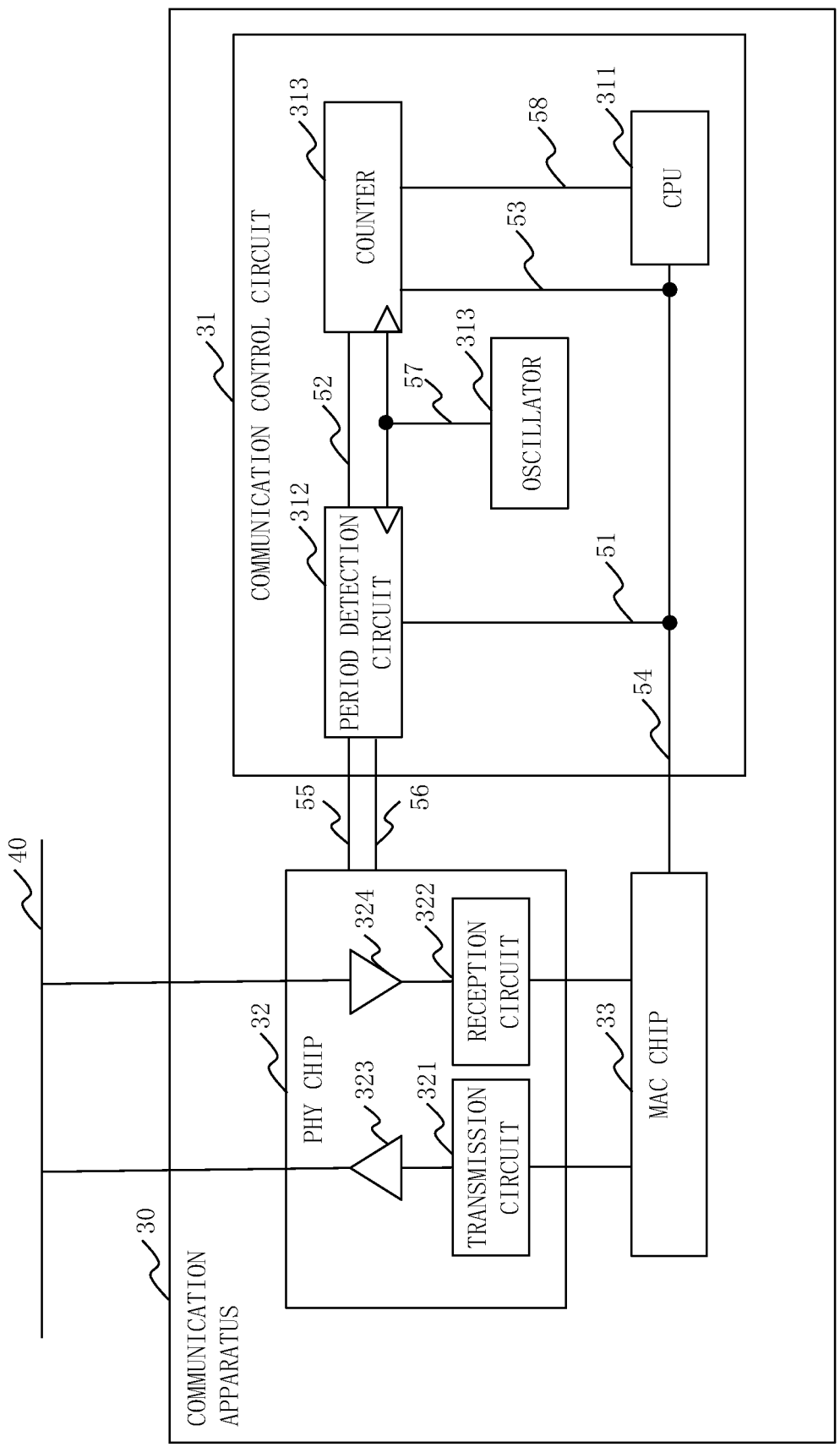
FIG. 3 is a configuration diagram of a communication apparatus 30 according to the first embodiment.

A configuration of the communication apparatus 30 according to the first embodiment will be described with reference to FIG. 3.

The communication apparatus 30 includes a communication control circuit 31, a PHY (PHYsical layer) chip 32, and a MAC (Medium Access Control) chip 33.

The communication control circuit 31 includes a CPU 311, a period detection circuit 312, a counter 313, and an oscillator 314. The PHY chip 32 includes a transmission circuit 321, a reception circuit 322, a transceiver 323, and a receiver 324.

Description of Operation

Figure 5:
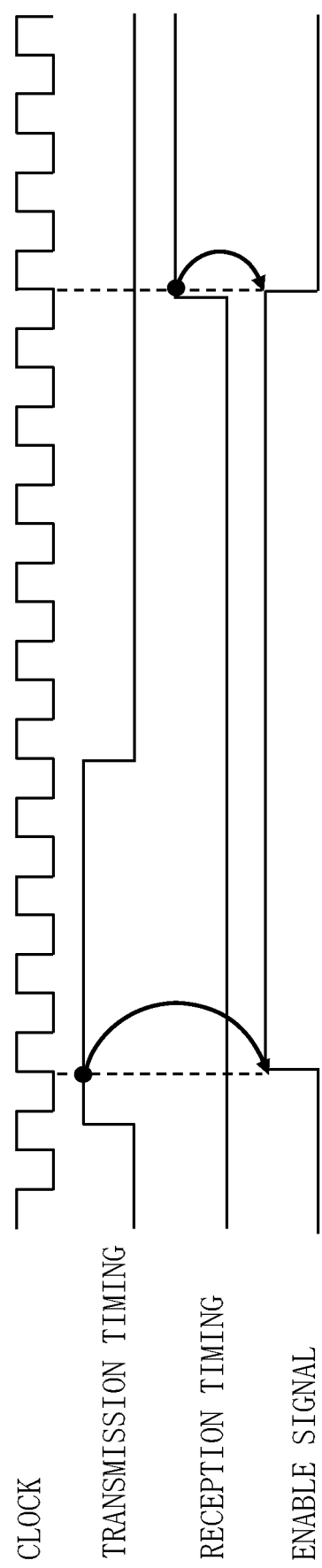
FIG. 5 is an explanatory diagram of a counting process of a first number by a measurement master according to the first embodiment.
Figure 6:
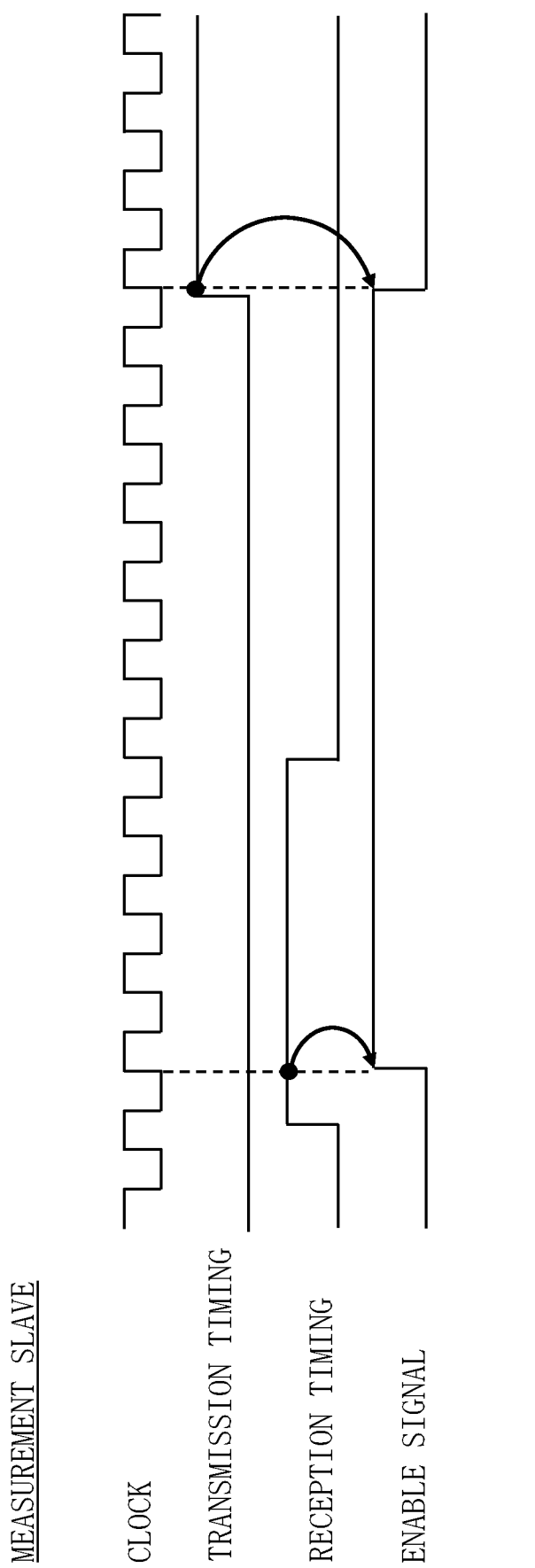
FIG. 6 is an explanatory diagram of a counting process of a second number by a measurement slave according to the first embodiment.

Operation of the cable length calculation system 10 according to the first embodiment will be described with reference to FIGS. 4 to 6.

The operation of the cable length calculation system 10 according to the first embodiment corresponds to a cable length calculation method according to the first embodiment.

In step S101, the setting unit 211 of the controller 20 specifies all the communication apparatuses 30 connected to the cable 40.

Specifically, the setting unit 211 specifies all the communication apparatuses 30 that are connected to the cable 40, by using means such as: a round-robin check by a Packet INternet Groper (Ping); or a sequence of Internet Protocol (IP) address lending by a Dynamic Host Configuration Protocol (DHCP).

In step S102, the setting unit 211 of the controller 20 selects a combination of two communication apparatuses 30 for specifying a length of a cable between the apparatuses from among the communication apparatuses 30 specified in step S101.

As a specific example, the setting unit 211 accepts user's handling on an input device connected via the cable 40, and selects the combination of two communication apparatuses 30 designated by the handling. Here, one of the two communication apparatuses 30 is referred to as a measurement master, and the other one is referred to as a measurement slave.

In step S103, the setting unit 211 of the controller 20 designates as a master, the measurement master which is one of the two communication apparatuses 30 specified in step S102, designates as a slave, the measurement slave which is the other one, and transmits to all the communication apparatuses 30 specified in step S101, a message notifying that the length of the cable 40 between the master and the slave is to be measured.

Specifically, by transmitting the message by a broadcast, the setting unit 211 notifies all the communication apparatuses 30 that the length of the cable 40 between the measurement master and the measurement slave is to be measured.

In step S104, the CPU 311 of the communication apparatus 30 that is not designated as either the master or the slave in the message transmitted in step S103 switches an operation mode to a wait mode. That is, the communication apparatus 30 other than the measurement master and the measurement slave which are selected in step S102 switches the operation mode to the wait mode.

When switched to the wait mode, the communication apparatus 30 stops transmitting a packet to the cable 40 during a standard period. The standard period is a period equal to or longer than a period during which processes from step S105 to step S110, which will be described later, are executed. Also, the standard period is a period equal to or longer than a period from a time when the measurement master transmits a measurement packet until a time when the measurement master receives a response packet. Based on the length, a signal propagation speed, and the like of the cable 40 that the cable length calculation system 10 includes, it is possible to specify at most what length of period the standard period should be set to.

In step S105, the CPU 311 of the measurement master which is the communication apparatus 30 designated as the master in the message transmitted in step S103, switches the operation mode to a measurement master mode.

When switched to the measurement master mode, the CPU 311 of the measurement master transmits a mode signal 51 to the period detection circuit 312, and sets the period detection circuit 312 to output an enable signal 52 from a time of transmitting the measurement packet to the cable 40 until a time of receiving the response packet from the cable 40. Further, the CPU 311 of the measurement master transmits a reset signal 53 to the counter 313 and resets a count value to 0.

In step S106, the CPU 311 of the measurement slave which is the communication apparatus 30 designated as the slave in the message transmitted in step S103, switches the operation mode to a measurement slave mode.

When switched to the measurement slave mode, the CPU 311 of the measurement slave transmits the mode signal 51 to the period detection circuit 312, and sets the period detection circuit 312 to output the enable signal 52 from a time of receiving the measurement packet from the cable 40 until a time of transmitting the response packet to the cable 40. Further, the CPU 311 of the measurement slave transmits the reset signal 53 to the counter 313 and resets the count value to 0.

In step S107, the CPU 311 of the measurement master transmits to the MAC chip 33, a control signal 54 instructing a measurement start. Then, based on control of the MAC chip 33, the transmission circuit 321 of the PHY chip 32 transmits to the cable 40 via the transceiver 323, the measurement packet addressed to the measurement slave. At this time, the transmission circuit 321 transmits a transmission timing signal 55 to the period detection circuit 312.

When the period detection circuit 312 of the measurement master receives the transmission timing signal 55, the period detection circuit 312 of the measurement master assumes that the measurement packet has been transmitted, and starts outputting the enable signal 52 according to setting in step S105. As illustrated in FIG. 5, while the enable signal 52 is output, the counter 313 of the measurement master counts as a first number, the number of clock signals 57 (count value 58) output by the oscillator 314.

In step S108, the reception circuit 322 of the PHY chip 32 of the measurement slave receives via the receiver 324, the measurement packet transmitted by the measurement master in step S107. Then, the reception circuit 322 transmits a reception timing signal 56 to the period detection circuit 312.

When the period detection circuit 312 of the measurement slave receives the reception timing signal 56, the period detection circuit 312 of the measurement slave assumes that the measurement packet has been received, and starts outputting the enable signal 52 according to setting in step S106. As illustrated in FIG. 6, while the enable signal 52 is output, the counter 313 of the measurement slave counts as a second number, the number of clock signals 57 (count value 58) output by the oscillator 314.

In step S109, the CPU 311 of the measurement slave transmits to the MAC chip 33, a control signal 54 instructing a response transmission. Then, based on the control of the MAC chip 33, the transmission circuit 321 of the PHY chip 32 transmits to the cable 40 via the transceiver 323, the response packet addressed to the measurement master. At this time, the transmission circuit 321 transmits a transmission timing signal 55 to the period detection circuit 312.

When the period detection circuit 312 of the measurement slave receives the transmission timing signal 55, the period detection circuit 312 of the measurement slave assumes that the response packet has been transmitted, and stops outputting the enable signal 52 according to the setting in step S106. As illustrated in FIG. 6, when the output of the enable signal 52 is stopped, the counter 313 of the measurement slave ends the count.

In step S110, the reception circuit 322 of the PHY chip 32 of the measurement master receives via the receiver 324, the response packet transmitted by the measurement slave in step S109. Then, the reception circuit 322 transmits a reception timing signal 56 to the period detection circuit 312.

When the period detection circuit 312 of the measurement master receives the reception timing signal 56, the period detection circuit 312 of the measurement master assumes that the response packet has been received, and stops outputting the enable signal 52 according to the setting in step S105. As illustrated in FIG. 5, when the output of the enable signal 52 is stopped, the counter 313 of the measurement master ends the count.

In step S111, the CPU 311 of the measurement master reads out from the counter 313, the first number which is the count value 58. The CPU 311 transmits to the MAC chip 33, a control signal 54 including the first number. Then, based on the control of the MAC chip 33, the transmission circuit 321 of the PHY chip 32 transmits a packet including the first number to the controller 20 as an address.

Then, the first number acquisition unit 212 of the controller 20 acquires the first number by receiving the packet including the first number.

In step S112, the CPU 311 of the measurement slave reads out from the counter 313, the second number which is the count value 58. The CPU 311 transmits to the MAC chip 33, the control signal 54 including the second number. Then, based on the control of the MAC chip 33, the transmission circuit 321 of the PHY chip 32 transmits a packet including the second number to the controller 20 as an address.

Then, the second number acquisition unit 213 of the controller 20 acquires the second number by receiving the packet including the second number.

In step S113, the cable length calculation unit 214 of the controller 20 calculates the length of the cable 40 between the measurement master and the measurement slave based on the first number acquired in step S111 and the second number acquired in step S112.

Specifically, the cable length calculation unit 214 calculates the length of the cable 40 between the measurement master and the measurement slave by: multiplying a value obtained by subtracting the second number from the first number by an oscillation cycle of the oscillator 314 and the signal propagation speed of the cable 40; and dividing by two. Note that, it is assumed that the oscillation cycle of the oscillator 314 and the signal propagation speed of the cable 40 are specified in advance.

In step S114, if a combination for which the length of the cable 40 has not been measured yet remains in the combinations of two communication apparatuses 30 which are subject to the measurement, the setting unit 211 of the controller 20 returns the process to step S102. Then, for the combination for which the length of the cable 40 has not been measured yet, a process is executed by taking one of the two communication apparatuses 30 as the measurement master and the other one as the measurement slave. On the other hand, the setting unit 211 ends the process when the measurement is already done for all the combinations of two communication apparatuses 30 which are subject to the measurement.

Effect of First Embodiment

As described above, in the cable length calculation system 10 according to the first embodiment, the measurement master counts as the first number, the number of clock signals 57 output by the oscillator from a time of transmitting the measurement packet until a time of receiving the response packet, and the measurement slave counts as the second number, the number of clock signals 57 output by the oscillator from a time of receiving the measurement packet until a time of transmitting the response packet. Then, the length of the cable between the measurement master and the measurement slave is calculated based on the first number and the second number. Hence, it is possible to enable to accurately measure the length of the cable between the communication apparatuses 30 online.

In particular, in the cable length calculation system 10 according to the first embodiment, it is possible to enable to accurately measure the length of the cable between the communication apparatuses 30 online by the measurement packet output by the PHY chip 32 which is general and the controller 20 which can be realized easily and inexpensively.

Other Configurations

First Modification Example

In the first embodiment, a case of measuring the length of the cable 40 between the communication apparatuses 30 has been described. However, it is also possible to measure the length of the cable 40 between the controller 20 and the communication apparatus 30 by a same method. In this case, the controller 20 may be the measurement master or may be the measurement slave.

Second Modification Example

In the first embodiment, each functional component is realized by software. However, as a second modification example, each functional component may be realized by hardware. For the second modification example, matters different from the first embodiment will be described.

Figure 7:
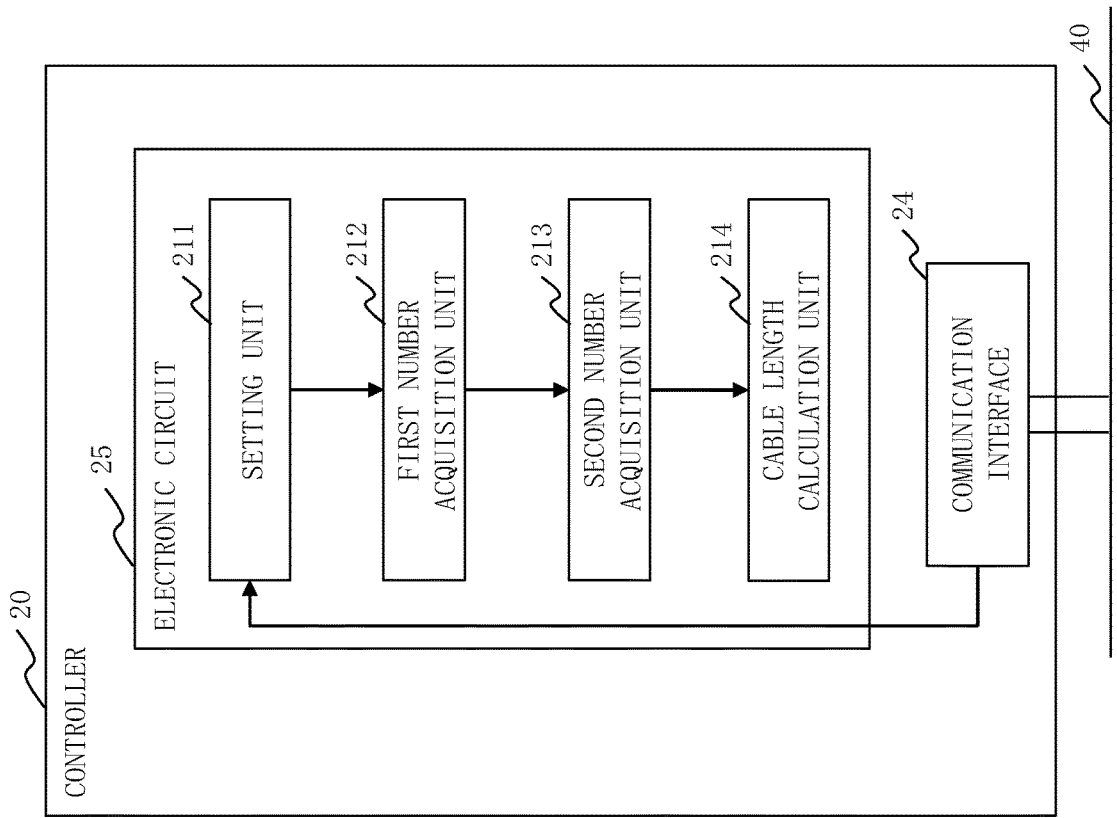
FIG. 7 is a configuration diagram of a controller 20 according to a second modification example.

A configuration of the controller 20 according to the second modification example will be described with reference to FIG. 7.

When each functional component is realized by the hardware, the controller 20 includes an electronic circuit 25 instead of the processor 21, the memory 22, and the storage 23. The electronic circuit 25 is a dedicated circuit that realizes functions of each functional component, the memory 22, and the storage 23.

As the electronic circuit 25, a single circuit, a composite circuit, a programmed processor, a parallel programmed processor, a logic IC, a Gate Array (GA), an Application Specific Integrated Circuit (ASIC), or a Field-Programmable Gate Array (FPGA) is assumed.

Each functional component may be realized by one electronic circuit 25, or each functional component may be distributed to a plurality of electronic circuits 25 and realized.

Third Modification Example

As a third modification example, each of some functional components may be realized by hardware and each of the other functional components may be realized by software.

The processor 21, the memory 22, the storage 23, and the electronic circuit 25 are referred to as processing circuitry. That is, the function of each functional component is realized by the processing circuitry.

Second Embodiment

A second embodiment is different from the first embodiment in that the controller 20 acquires the oscillation cycle of the oscillator 314 from the measurement master and the measurement slave. In the second embodiment, these different matters will be described, and descriptions of same matters will be omitted.

Description of Operation

Figure 8:
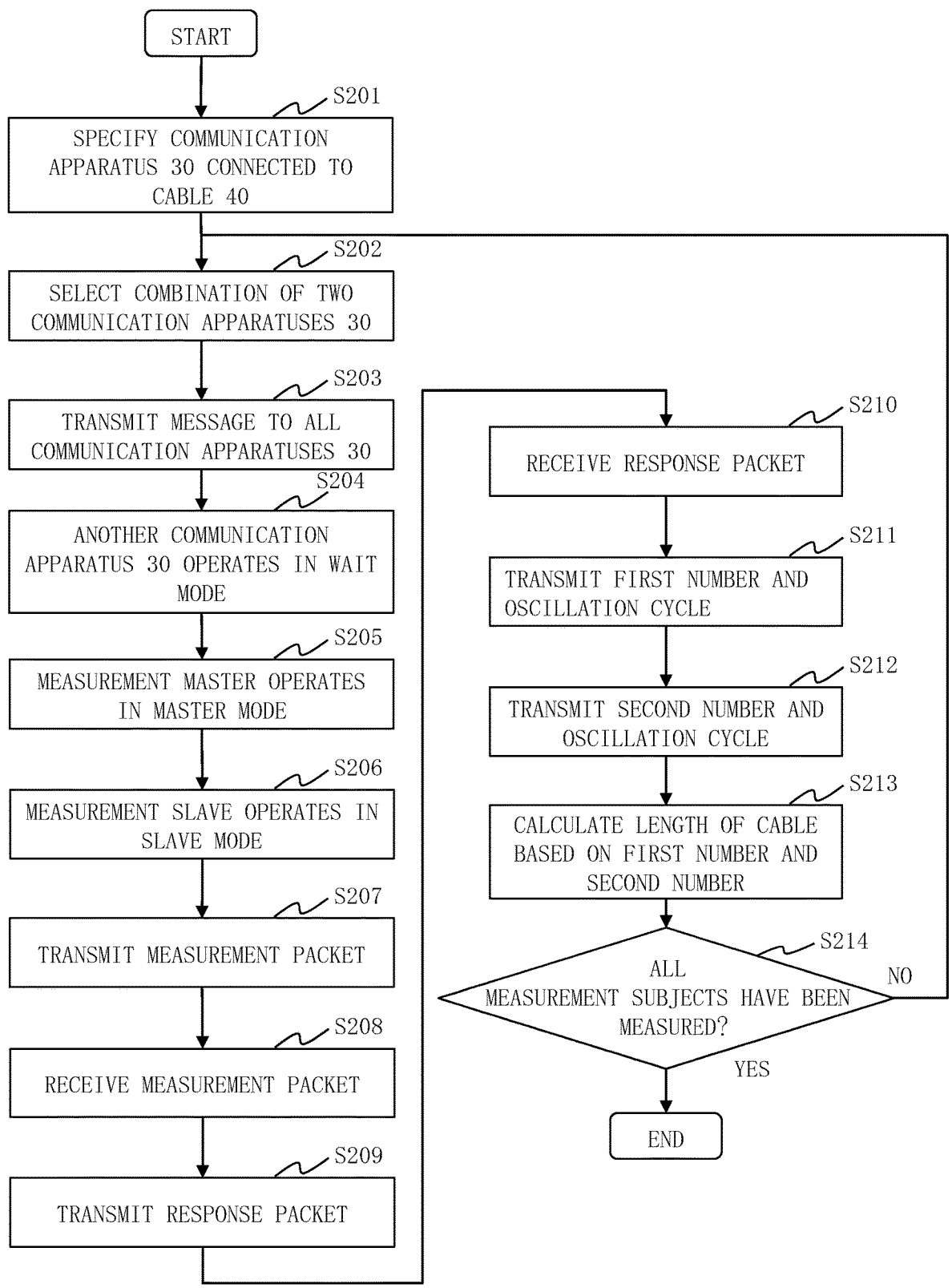
FIG. 8 is a flowchart illustrating operation of a cable length calculation system 10 according to a second embodiment.

Operation of the cable length calculation system 10 according to the second embodiment will be described with reference to FIG. 8.

The operation of the cable length calculation system 10 according to the second embodiment corresponds to a cable length calculation method according to the second embodiment.

Figure 4:
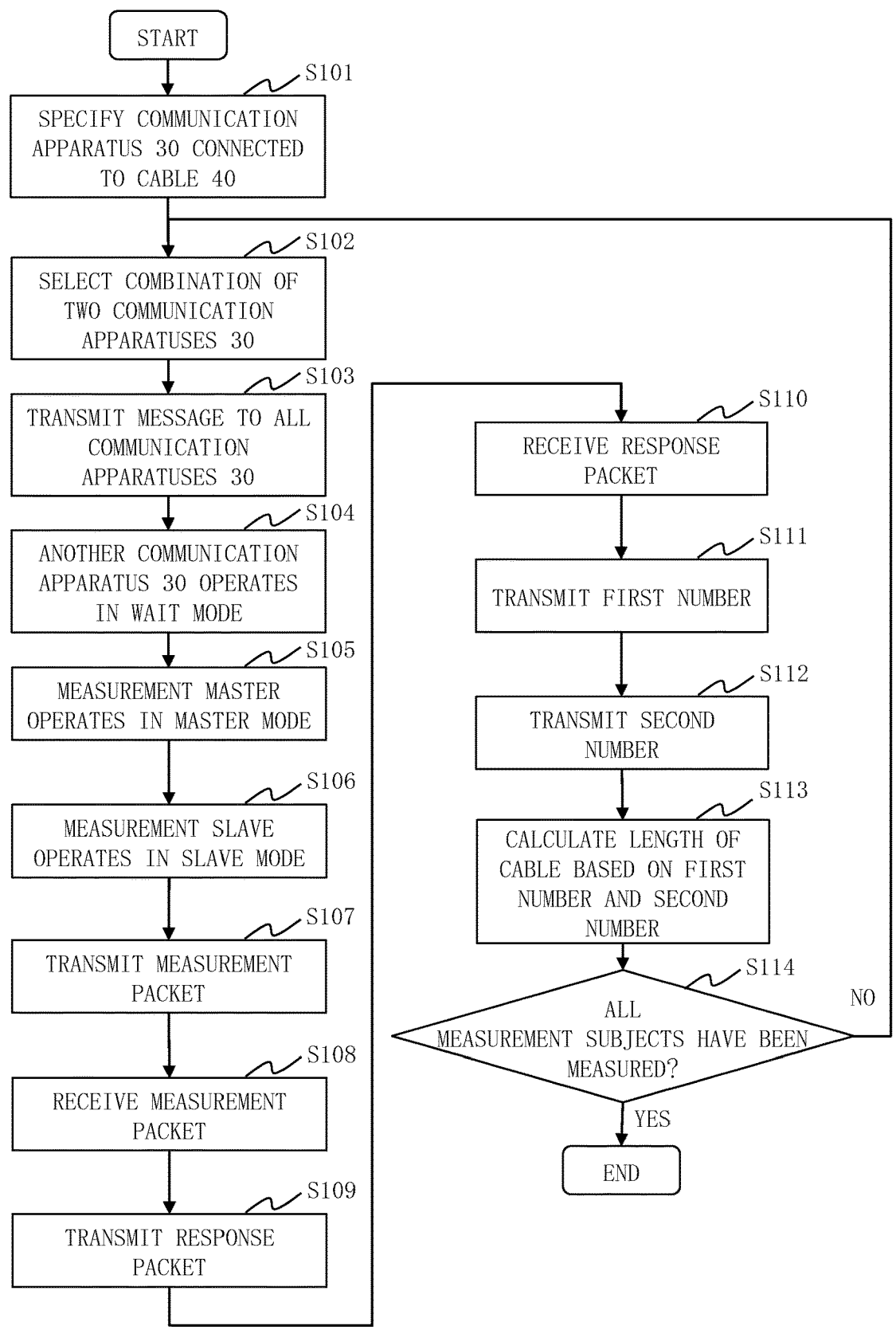
FIG. 4 is a flowchart illustrating operation of the cable length calculation system 10 according to the first embodiment.

Processes of step S201 to step S210 are the same as the processes of steps S101 to step S110 of FIG. 4. Further, process of step S214 is the same as the process of step S114 of FIG. 4.

In step S211, the CPU 311 of the measurement master transmits to the MAC chip 33, a control signal 54 including the first number and a first cycle which is the oscillation cycle of the oscillator 314. Then, based on the control of the MAC chip 33, the transmission circuit 321 of the PHY chip 32 transmits a packet including the first number and the first cycle to the controller 20 as an address.

Then, the first number acquisition unit 212 of the controller 20 acquires the first number and the first cycle by receiving the packet including the first number and the first cycle.

In step S212, the CPU 311 of the measurement slave transmits to the MAC chip 33, a control signal 54 including the second number and a second cycle which is the oscillation cycle of the oscillator 314. Then, based on the control of the MAC chip 33, the transmission circuit 321 of the PHY chip 32 transmits a packet including the second number and the second cycle to the controller 20 as an address.

Then, the second number acquisition unit 213 of the controller 20 acquires the second number and the second cycle by receiving the packet including the second number and the second cycle.

In step S213, the cable length calculation unit 214 of the controller 20 subtracts a value obtained by multiplying the second number by the second cycle from a value obtained by multiplying the first number by the first cycle. The cable length calculation unit 214 calculates the length of the cable 40 between the measurement master and the measurement slave by: multiplying a value calculated by a subtraction by the signal propagation speed of the cable 40; and dividing by two.

Effect of Second Embodiment

As described above, in the cable length calculation system 10 according to the second embodiment, it is possible to enable to accurately measure the length of the cable between the communication apparatuses 30 online without the controller 20 grasping the oscillation cycle of the oscillator 314 of the communication apparatus 30 in advance.

Therefore, since it is unnecessary to provide a dedicated oscillator 314 for measuring the length of the cable 40, it is possible to easily expand a lineup of the communication apparatuses 30.

REFERENCE SIGNS LIST

10: cable length calculation system, 20: controller, 21: processor, 22: memory, 23: storage, 24: communication interface, 25: electronic circuit, 211: setting unit, 212: first number acquisition unit, 213: second number acquisition unit, 214: cable length calculation unit, 30: communication apparatus, 31: communication control circuit, 311: CPU, 312: period detection circuit, 313: counter, 314: oscillator, 32: PHY chip, 321: transmission circuit, 322: reception circuit, 323: transceiver, 324: receiver, 33: MAC chip, 40: cable, 51: mode signal, 52: enable signal, 53: reset signal, 54: control signal, 55: transmission timing signal, 56: reception timing signal, 57: clock signal, 58: count value.

The invention claimed is:

1. A cable length calculation system comprising a controller and a plurality of communication apparatuses which are connected via a cable,
wherein a measurement master which is one communication apparatus among the plurality of communication apparatuses counts as a first number, the number of clock signals output by an oscillator from a time of transmitting a measurement packet to the cable until a time of receiving a response packet from the cable, and
wherein a measurement slave which is a communication apparatus different from the measurement master among the plurality of communication apparatuses counts as a second number, the number of clock signals output by an oscillator from a time of receiving from the cable, the measurement packet transmitted by the measurement master until a time of transmitting the response packet to the cable, and
wherein the controller calculates a length of the cable between the measurement master and the measurement slave based on the first number counted by the measurement master and the second number counted by the measurement slave, the length of the cable being calculated by multiplying a value obtained by subtracting the second number from the first number by an oscillation cycle of the oscillator and a signal propagation speed of the cable; and dividing by two, and
wherein when a length of the cable between two communication apparatuses is measured, the controller transmits to the plurality of communication apparatuses, a message notifying that one of the two communication apparatuses is designated as a master and the other one is designated as a slave, and
wherein among the plurality of communication apparatuses, a communication apparatus designated as a master operates as the measurement master and a communication apparatus designated as a slave operates as the measurement slave.

2. The cable length calculation system according to claim 1,
wherein a communication apparatus other than the two communication apparatuses which are the measurement master and the measurement slave among the plurality of communication apparatuses stops transmitting a packet to the cable from a time when the measurement master transmits a measurement packet until a time when the measurement master receives a response packet.

3. A cable length calculation system comprising a controller and a plurality of communication apparatuses which are connected via a cable,
wherein a measurement master which is one communication apparatus among the plurality of communication apparatuses counts as a first number, the number of clock signals output by an oscillator from a time of transmitting a measurement packet to the cable until a time of receiving a response packet from the cable, and
wherein a measurement slave which is a communication apparatus different from the measurement master among the plurality of communication apparatuses counts as a second number, the number of clock signals output by an oscillator from a time of receiving from the cable, the measurement packet transmitted by the measurement master until a time of transmitting the response packet to the cable, and
wherein the controller calculates a length of the cable between the measurement master and the measurement slave based on the first number counted by the measurement master and the second number counted by the measurement slave, and
wherein the controller acquires as a first cycle, an oscillation cycle of the oscillator of the measurement master together with the first number from the measurement master, acquires as a second cycle, an oscillation cycle of the oscillator of the measurement slave together with the second number from the measurement slave, and calculates the length of the cable by:
subtracting a value obtained by multiplying the second number by the second cycle from a value obtained by multiplying the first number by the first cycle;
multiplying a value calculated by a subtraction by a signal propagation speed of the cable;
and dividing by two, and
wherein when a length of the cable between two communication apparatuses is measured, the controller transmits to the plurality of communication apparatuses, a message notifying that one of the two communication apparatuses is designated as a master and the other one is designated as a slave, and
wherein among the plurality of communication apparatuses, a communication apparatus designated as a master operates as the measurement master and a communication apparatus designated as a slave operates as the measurement slave.

4. A cable length calculation method comprising:
counting, by a measurement master which is one communication apparatus among a plurality of communication apparatuses which are connected via a cable, as a first number, the number of clock signals output by an oscillator from a time of transmitting a measurement packet to the cable until a time of receiving a response packet from the cable;
counting, by a measurement slave which is a communication apparatus different from the measurement master among the plurality of communication apparatuses, as a second number, the number of clock signals output by an oscillator from a time of receiving from the cable, the measurement packet transmitted by the measurement master until a time of transmitting the response packet to the cable;

calculating, by a controller, a length of the cable between the measurement master and the measurement slave based on the first number counted by the measurement master and the second number counted by the measurement slave; and when a length of the cable between two communication apparatuses is measured, transmitting, by the controller, to the plurality of communication apparatuses, a message notifying that one of the two communication apparatuses is designated as a master and the other one is designated as a slave, and wherein among the plurality of communication apparatuses, a communication apparatus designated as a master operates as the measurement master and a communication apparatus designated as a slave operates as the measurement slave, and wherein the length of the cable is calculated by multiplying a value obtained by subtracting the second number from the first number by an oscillation cycle of the oscillator and a signal propagation speed of the cable; and dividing by two.

5. A cable length calculation method comprising:

counting, by a measurement master which is one communication apparatus among a plurality of communication apparatuses which are connected via a cable, as a first number, the number of clock signals output by an oscillator from a time of transmitting a measurement packet to the cable until a time of receiving a response packet from the cable;

counting, by a measurement slave which is a communication apparatus different from the measurement master among the plurality of communication apparatuses, as a second number, the number of clock signals output by an oscillator from a time of receiving from the cable, the measurement packet transmitted by the measurement master until a time of transmitting the response packet to the cable;

calculating, by a controller, a length of the cable between the measurement master and the measurement slave based on the first number counted by the measurement master and the second number counted by the measurement slave;

acquiring, by the controller, as a first cycle, an oscillation cycle of the oscillator of the measurement master together with the first number from the measurement master;

acquiring, by the controller, as a second cycle, an oscillation cycle of the oscillator of the measurement slave together with the second number from the measurement slave;

calculating, by the controller, the length of the cable by:
  subtracting a value obtained by multiplying the second number by the second cycle from a value obtained by multiplying the first number by the first cycle;
  multiplying a value calculated by a subtraction by a signal propagation speed of the cable;
  and dividing by two; and when a length of the cable between two communication apparatuses is measured, transmitting, by the controller, to the plurality of communication apparatuses, a message notifying that one of the two communication apparatuses is designated as a master and the other one is designated as a slave, and wherein among the plurality of communication apparatuses, a communication apparatus designated as a master operates as the measurement master and a communication apparatus designated as a slave operates as the measurement slave.

* * * * *